(12) United States Patent
Chen et al.

(10) Patent No.: US 9,537,523 B2
(45) Date of Patent: Jan. 3, 2017

(54) COVER OF A HANDHELD ELECTRONIC DEVICE

(71) Applicants: CHAMP TECH OPTICAL (FOSHAN) CORPORATION, Foshan (CN); Foxconn Technology Co., Ltd., New Taipei (TW)

(72) Inventors: Hai-Lin Chen, Foshan (CN); Di-Qiong Zhao, Foshan (CN); Ching-Hsing Huang, New Taipei (TW); Chih-Feng Hu, New Taipei (TW); Yung-Ping Lin, New Taipei (TW)

(73) Assignees: CHAMP TECH OPTICAL (FOSHAN) CORPORATION, Foshan (CN); Foxconn Technology Co., Ltd., New Taipei (TW)

( * ) Notice: Subject to any disclaimer, the term of this patent is extended or adjusted under 35 U.S.C. 154(b) by 74 days.

(21) Appl. No.: 14/526,146

(22) Filed: Oct. 28, 2014

(65) Prior Publication Data

US 2016/0065261 A1 Mar. 3, 2016

(30) Foreign Application Priority Data

Sep. 2, 2014 (CN) .......................... 2014 1 0442096

(51) Int. Cl.
| | |
|---|---|
| *H04M 1/00* | (2006.01) |
| *H04B 1/3883* | (2015.01) |
| *H02J 7/00* | (2006.01) |
| *H04B 1/3888* | (2015.01) |
| *H02J 7/02* | (2016.01) |
| *H04M 1/02* | (2006.01) |

(52) U.S. Cl.
CPC ........... *H04B 1/3883* (2013.01); *H02J 7/0042* (2013.01); *H04B 1/3888* (2013.01); *H02J 7/025* (2013.01); *H04M 1/0262* (2013.01)

(58) Field of Classification Search
None
See application file for complete search history.

(56) References Cited

U.S. PATENT DOCUMENTS

| | | | |
|---|---|---|---|
| 2009/0075706 A1* | 3/2009 | Chen ..................... | H04M 1/026 455/575.3 |
| 2009/0142477 A1* | 6/2009 | Chen ................. | B29C 45/14639 427/96.1 |
| 2011/0130854 A1* | 6/2011 | Lettenbauer ........ | B29C 33/3835 700/98 |
| 2014/0020697 A1* | 1/2014 | Liu ........................ | A24F 15/00 131/329 |
| 2014/0057687 A1* | 2/2014 | Yoo ...................... | H04B 1/3888 455/575.8 |
| 2014/0117926 A1* | 5/2014 | Hwu ....................... | H02J 7/025 320/108 |
| 2014/0253024 A1* | 9/2014 | Rautiainen .............. | H02J 7/025 320/108 |

(Continued)

*Primary Examiner* — Dominic Rego
(74) *Attorney, Agent, or Firm* — Zhigang Ma

(57) ABSTRACT

A cover configured to be attached to, and cover a portion of, a handheld electronic device. The cover includes a shell having a first side and a second side and a wireless charging receiver module connectable to the handheld electronic device. When attached to the handheld electronic device the first side of the shell faces the handheld electronic device. The wireless charging receiver module is positioned on the first side of the shell.

15 Claims, 4 Drawing Sheets

(56) References Cited

U.S. PATENT DOCUMENTS

| | | | | |
|---|---|---|---|---|
| 2014/0306652 A1* | 10/2014 | Huang | H02J 7/025 | 320/108 |
| 2014/0335784 A1* | 11/2014 | Ozenne | H04B 5/0031 | 455/41.1 |
| 2015/0015196 A1* | 1/2015 | Ormesher | H02J 7/025 | 320/108 |
| 2015/0094122 A1* | 4/2015 | Huang | H04M 1/04 | 455/567 |
| 2015/0115724 A1* | 4/2015 | Park | H01F 27/2804 | 307/104 |
| 2015/0172431 A1* | 6/2015 | Huang | H04B 1/3888 | 455/556.1 |
| 2015/0198981 A1* | 7/2015 | Chung | G06F 1/1656 | 361/679.55 |
| 2015/0236539 A1* | 8/2015 | Park | H04B 1/3883 | 455/573 |
| 2015/0256021 A1* | 9/2015 | Kwon | H02J 7/025 | 320/108 |
| 2015/0326054 A1* | 11/2015 | Park | H02J 7/025 | 455/573 |
| 2015/0349578 A1* | 12/2015 | Hu | H02J 7/0042 | 320/108 |

* cited by examiner

COVER OF A HANDHELD ELECTRONIC DEVICE

FIELD

The disclosure relates to a field of wireless communications, and particularly relates to a cover of a handheld electronic device.

BACKGROUND

A cover of a handheld electronic device made of metallic materials becomes more and more popular because of the texture and character of metal. Along with development and popularization of wireless charging technology, a wireless charging receiver module can be placed in a cover of a handheld electronic device functions as a wireless charger.

BRIEF DESCRIPTION OF THE DRAWINGS

Implementations of the present technology will now be described, by way of example only, with reference to the attached figures.

DETAILED DESCRIPTION

Figure 1:
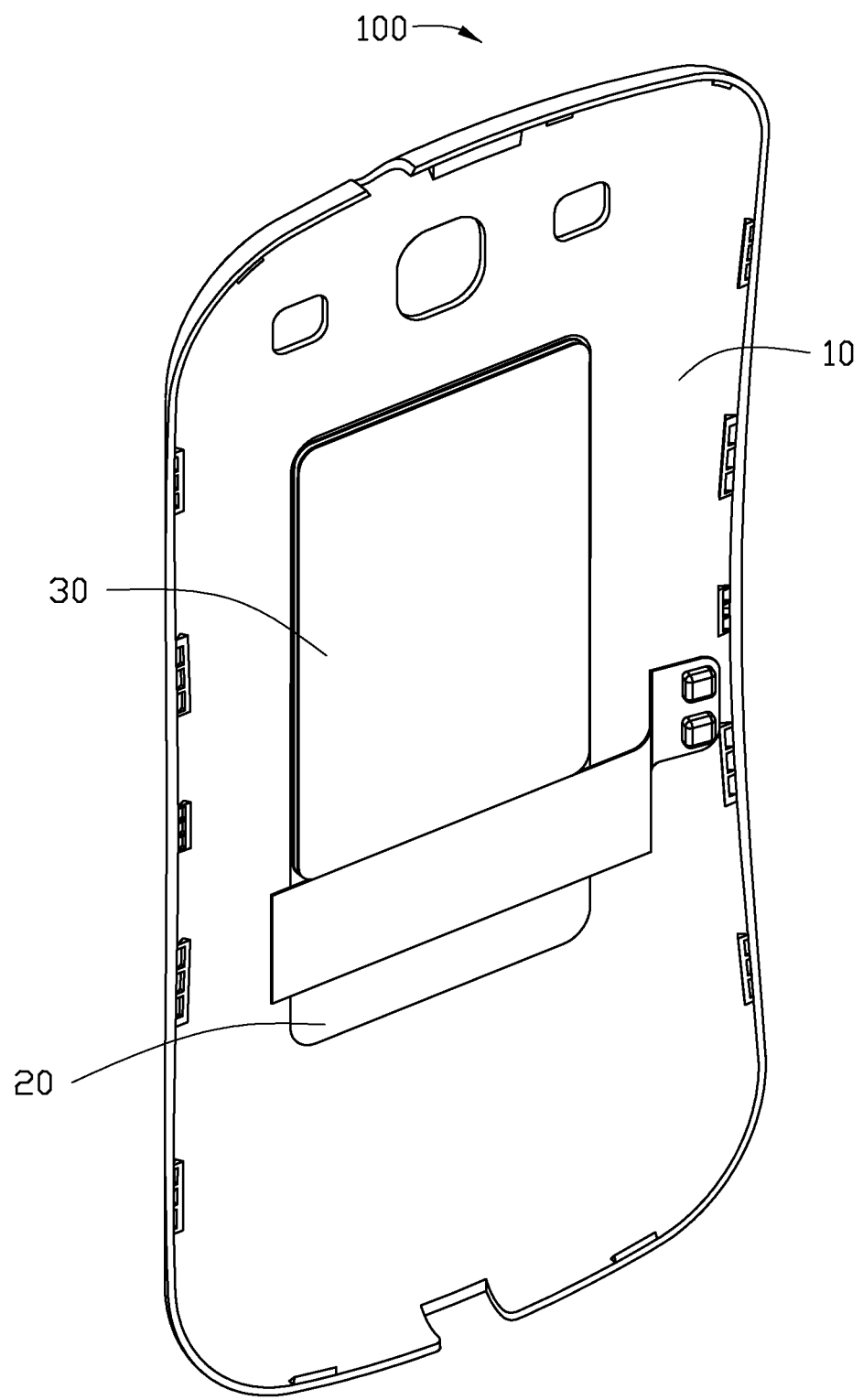
FIG. 1 is an isometric view of a phone cover in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A cover configured to be attached to, and cover a portion of, a handheld electronic device. The cover includes a shell having a first side and a second side and a wireless charging receiver module connectable to the handheld electronic device. When attached to the handheld electronic device the first side of the shell faces the handheld electronic device. The wireless charging receiver module is positioned on the first side of the shell. The handheld electronic device in this disclosure can be any handheld electronic devices, such as a tablet personal computer, a phone, a MP4 and so on. In this embodiment, the cover of a handheld electronic device is a cover of a phone.

Referring to FIG. 1, a phone cover 100 in the present disclosure includes a shell 10, a supporting board 20 and a wireless charging receiver module 30. The supporting board 20 is fixed at center of the shell 10. The wireless charging receiver module 30 is fixed on the supporting board 20 and is located inside of the shell 10.

Figure 2:
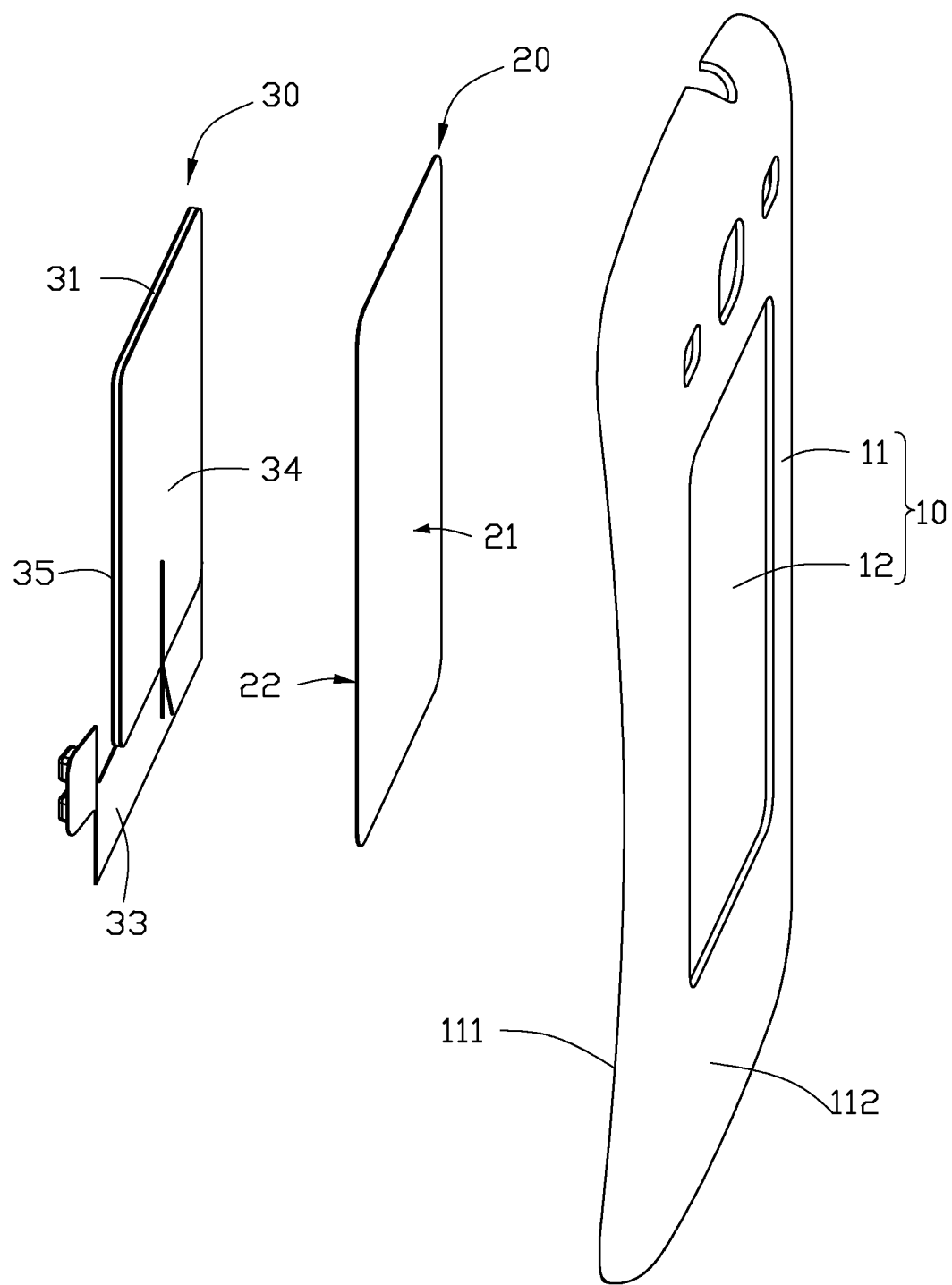
FIG. 2 is an isometric, exploded view of the phone cover in FIG. 1.

Referring to FIG. 2, the shell 10 is made of metallic material. The shell 10 includes a main body 11 and a through-hole 12. In this embodiment, the main body 11 is made of aluminium. The main body 11 includes a first side 111 and a second side 112. The through-hole 12 is defined substantially in center of the shell 10. In this embodiment, the through-hole 12 is configured as a rectangle. In other embodiments, the through-hole 12 can also have other configurations.

The supporting board 20 is made of material which will not be influence in electromagnetic induction. In this embodiment, the supporting board 20 is made of plastic. The supporting board 20 is formed in the through-hole 12 of the shell 10 via injection molding techniques or nanometer film forming technology. A shape and sizes of the supporting board 20 are equal to those of the through-hole 12, respectively. The supporting board 20 is closely formed on the main body 11 of the shell 10 firmly. The supporting board 20 includes a bottom surface 21 and an opposite connecting surface 22. The bottom surface 21 faces outside of the shell 10. The connecting surface 22 faces inside of the shell 10 to connect the wireless charging receiver module 30.

Figure 3:
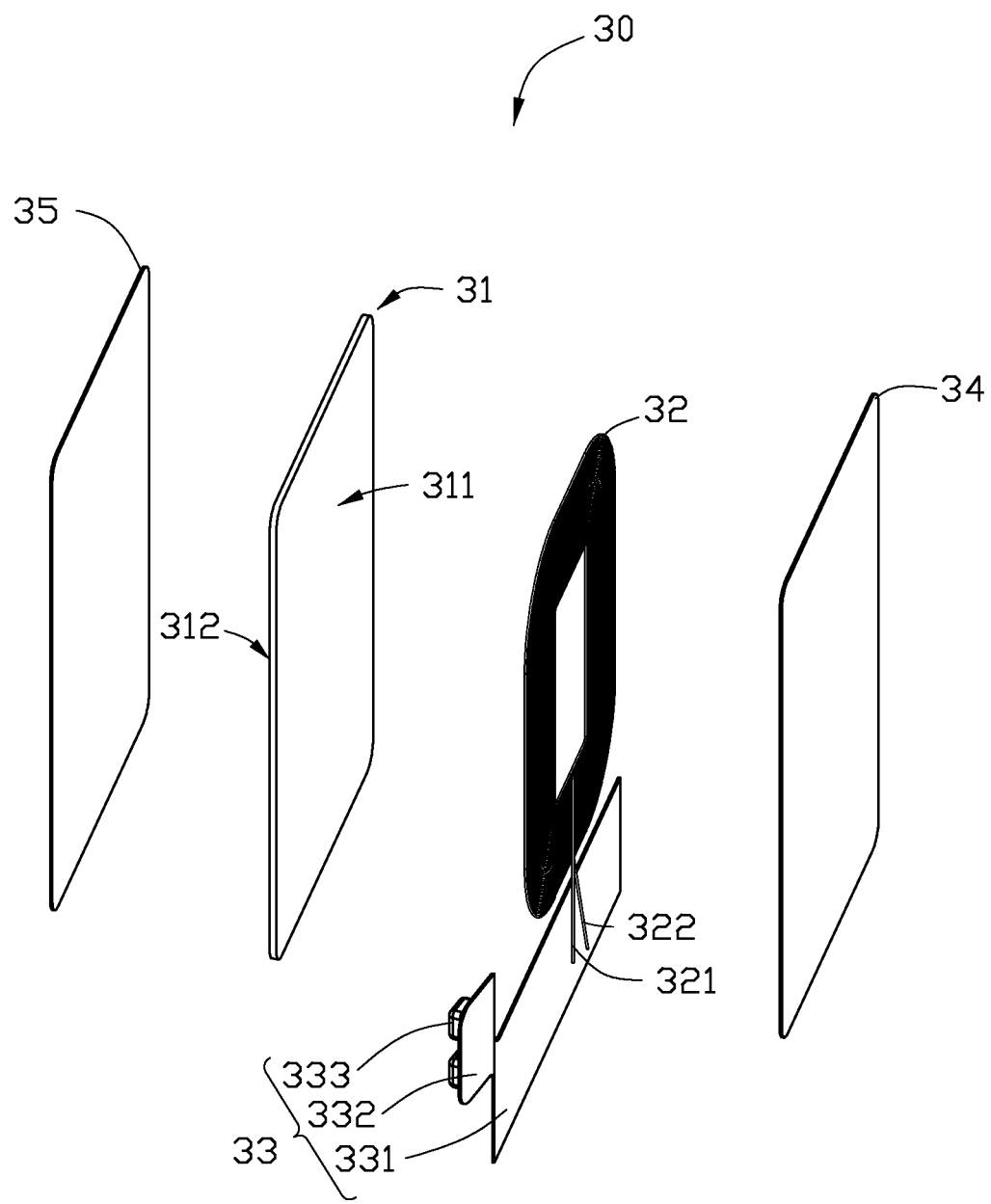
FIG. 3 is an isometric, exploded view of a wireless charging receiver module of the phone cover in FIG. 2.

Referring to FIG. 3 at the same time, the wireless charging receiver module 30 includes a magnetic isolation sheet 31, a loop 32 and a conductive plate 33. The loop 32 is located at center of the magnetic isolation sheet 31. The conductive plate 33 is located at an end of the magnetic isolation sheet 32.

The magnetic isolation sheet 31 is a rectangular board. The magnetic isolation sheet 31 is used for decreasing absorption of high frequency electromagnetic energy generated from metal materials in a phone which is matched with the phone cover 100 recited in the present disclosure. In this embodiment, the magnetic isolation sheet 31 is a ferrite. In other embodiments, the magnetic isolation sheet 31 can also be made of other materials. In this embodiment, a width of the magnetic isolation sheet 31 is equal to that of the supporting board 20. A length of the magnetic isolation sheet 31 is smaller than that of the supporting board 20. The magnetic isolation sheet 31 includes a first surface 311 and an opposite second surface 312. The first surface 311 faces inside of the shell 10 and the second surface 312 is opposite to the shell 10.

The loop 32 is wound by a thin metal wire from inside to outside. The loop 32 includes a first transmitting end 321 and a second transmitting end 322. In this embodiment, the loop 32 is wound as a rectangular frame. In other embodiments, the loop 32 can also have other shapes. Sizes of the frame of the loop 32 are increased by degrees from inside to outside. The first transmitting end 321 is one end of the metal wire which is stretched from the inside of the loop 32. The second transmitting end 322 is the other end of the metal wire which is stretched from the outside of the loop 32. A width and a length of an outside frame of the loop 32 are respectively smaller than those of the magnetic isolation sheet 31.

The conductive plate 33 is a circuit plate. The conductive plate 33 is used for conducting induction current which is produced by the loop 32. In this embodiment, the conductive plate 33 is a printed circuit board. The conductive plate 33 includes a main portion 331, a stretched portion 332 and two transmitting pins 333 which are fixed on the stretched portion 332. In this embodiment, the main portion 331 is a lathy and rectangular plate. In other embodiments, the main portion 331 can also have other shapes. A length of the main portion 331 is larger than a width of the magnetic isolation sheet 31. A width of the main portion 331 is smaller than a margin between lengths of the supporting board 20 and the magnetic isolation sheet 31. The stretched portion 332 is extended from one corner of the main portion 331. In this embodiment, the stretched portion 332 is a quadrate plate. In other embodiments, the stretched portion 332 can also have other shapes. The stretched portion 332 is perpendicular to the main portion 331. The two transmitting pins 333 are fixed on the stretched portion 332, spacing from each other. The two transmitting pins 333 are opposite to the supporting board 20.

Referring to FIG. 2 and FIG. 3, the first transmitting end 321 and the second transmitting end 322 of the loop 32 are welded on one side of the main portion 331 of the conductive plate 33. The first transmitting end 321 and the second transmitting end 322 of the loop 32 face the supporting board 20. The loop 32 is fixed on center of the first surface 311 of the magnetic isolation sheet 31. The magnetic isolation sheet 31 and the loop 32 are fixed together on the connecting surface 22 of the supporting board 20. The main portion 331 of the magnetic isolation sheet 31 is breadth-wise fixed on the connecting surface 22 of the supporting board 20. Herein, one edge of the magnetic isolation sheet 31 is close to a corresponding edge of the supporting board 20. The main portion 331 is close to the other edge of the magnetic isolation sheet 31.

The wireless charging receiver module 30 further includes a first veneer 34 and a second veneer 35.

In this embodiment, a shape and sizes of the first veneer 34 are equal to those of the magnetic isolation sheet 31. In other embodiments, the first veneer 34 can also have other shapes or sizes. Both sides of the first veneer 34 are sticky. One side of the veneer 34 is used for fixing the loop 32 to center of the first surface 311 of the magnetic isolation sheet 31. The other side of the first veneer 34 is used for fixing the loop 32 and the magnetic isolation sheet 31 to the connecting surface 22 of the supporting board 20 together.

A shape and sizes of the second veneer 35 are equal to those of the magnetic isolation sheet 31. Only one side of the second veneer 35 is sticky. The sticky side of the second veneer 35 is attached completely on the second surface 312 of the magnetic isolation sheet 31 to protect the magnetic isolation sheet 31.

Figure 4:
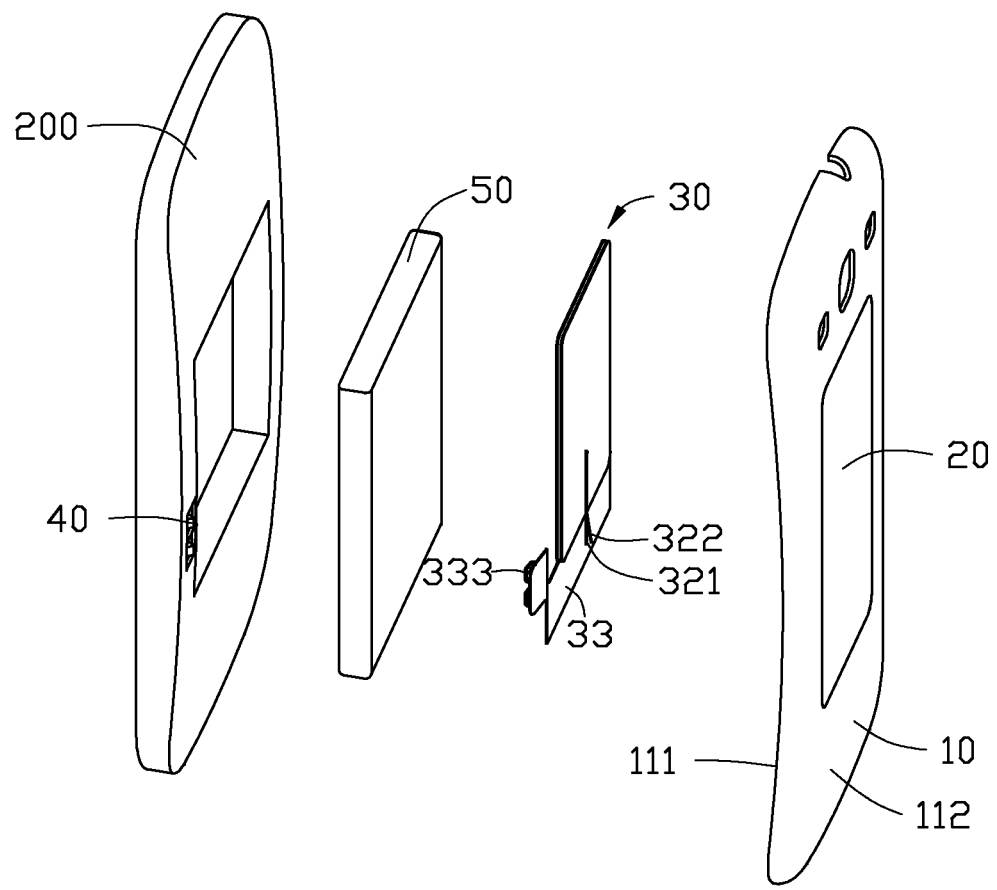
FIG. 4 is an exploded view of the phone cover in FIG. 1 applied in a phone.

Referring to FIG. 4, the phone cover 100 can be disassembly fixed on a phone 200. In this embodiment, the phone 200 includes two receiving pins 40 and a battery 50. When the phone cover 100 is assembled in the phone 200, the first side 111 of the phone cover 100 covers the battery 50 of the phone 200. The two receiving pins 40 of the phone 200 are respectively connected with the two transmitting pins 50 of the conductive plate 33.

Referring to FIG. 3 and FIG. 4, when a phone 200 with the phone cover 100 is wireless charged in the present disclosure, the phone 200 can be moved into the charging region of the wireless charging emission module. The wireless charging receiver module 30 can receive high frequency electromagnetic energy transmitted by the wireless charging emission module automatically. The loop 32 of the wireless charging receiver module 30 can produce induction current when it is in the magnetic field of the high frequency electromagnetic energy. The induction current flows from the first transmitting end 321 and the second transmitting end 322 of the loop 32 to the conductive plate 33 and then flows from the two transmitting pins 333 of conductive plate 33 to the two receiving pins 40 of the phone 200, thereof putting a direct voltage on two ends of the battery 50 to charge the battery 50.

Compared to traditional phone covers, the phone cover 100 in the present disclosure is made of metallic materials and plastic. Plastic is used in a region where the wireless charging receiver module 30 is placed in. Metallic materials are used in other portions of the phone cover 100 except the region where the wireless charging receiver module 30 placed in. In other words, the shell 10 is made of metallic material and the supporting board 20 is made of plastic. The shell 10 and the supporting board 20 are closely integrated with each other. Because the supporting board 20 is plastic, a signal of wireless charging and a magnetic field will not be absorbed by the supporting board 20, but penetrate the supporting board 20 and can be received by the wireless charging receiver module 30. In this way, a phone with the back-cover 100 in the present disclosure not only can have texture and beauty of metal, but also can have a function of wireless charging.

Furthermore, sizes of the supporting board 20 are more than that of the loop 32 of the wireless charging receiver module 30, so the loop 32 can be located completely at a magnetic field which penetrates from the supporting board 20 to improve efficiency of wireless charging.

The embodiment shown and described above is only an example. Many details are often found in the art such as the other features of a tube. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A cover configured to be attached to, and cover a portion of, a handheld electronic device, the cover comprising:
   a shell having a first side and an opposite second side, and defining a through hole;
   a supporting board positioned substantially within the through-hole of the shell;
   a wireless charging receiver module connectable to the handheld electronic device, attached on the supporting board, and located inside of the shell;
   wherein, when attached to the handheld electronic device the first side of the shell faces the handheld electronic device; and
   wherein, the wireless charging receiver module is positioned on the first side of the shell;
   wherein, the wireless charging receiver module comprises a magnetic isolation sheet, a loop and a conductive plate; the loop is located at center of the magnetic isolation sheet, and the conductive plate is located at an end of the magnetic isolation sheet.

2. The cover of claim 1, wherein the shell is made of metallic material.

3. The cover of claim 1, wherein the supporting board is made of plastic.

4. The cover of claim 1, wherein the through-hole is configured substantially in center of the shell and as a rectangle.

5. The cover of claim 1, wherein the supporting board is positioned within the through-hole of the shell by using injection molding techniques or nanometer film forming technology.

6. The cover of claim 5, wherein a shape and sizes of the supporting board are equal to those of the through-hole, respectively.

7. The cover of claim 1, wherein the magnetic isolation sheet is a ferrite to decrease absorption of high frequency electromagnetic energy generated from metal materials in the handheld electronic device.

8. The cover of claim 1, wherein the loop is located between the magnetic isolation sheet and the supporting board and can receive a signal of wireless charging outside.

9. The cover of claim 8, wherein a width and a length of the loop are respectively smaller than those of the magnetic isolation sheet.

10. The cover of claim 8, wherein a width of the magnetic isolation sheet is equal to that of the supporting board; and a length of the magnetic isolation sheet is smaller than that of the supporting board.

11. The cover of claim 8, wherein the loop is a frame which is wound by a thin metal wire from inside to outside, and the loop can produce induction current in an outside magnetic field.

12. The cover of claim 11, wherein the loop comprises a first transmitting end and a second transmitting end, the first transmitting end and the second transmitting end are connected with the conductive plate to transmit the induction current produced by the loop to the conductive plate.

13. The cover of claim 12, wherein the conductive plate has two transmitting pins fixed thereon, and the two transmitting pins transmit the induction current produced by the loop to the handheld electronic device.

14. The cover of claim 11, wherein the conductive plate is a circuit plate.

15. A cover configured to be attached to, and cover a portion of, a handheld electronic device, the cover comprising:
a shell having a first side and an opposite second side, and
a wireless charging receiver module connectable to the handheld electronic device;
wherein, when attached to the handheld electronic device the first side of the shell faces the handheld electronic device;
wherein, the wireless charging receiver module is positioned on the first side of the shell;
wherein the wireless charging receiver module comprises a magnetic isolation sheet, a loop and a conductive plate; the loop is located at center of the magnetic isolation sheet, and the conductive plate is located at an end of the magnetic isolation sheet.

* * * * *